(12) United States Patent
Gilbert-Eyres et al.

(10) Patent No.: US 11,919,475 B2
(45) Date of Patent: Mar. 5, 2024

(54) METHODS AND SYSTEMS TO DETECT VEHICLE THEFT EVENTS (71) Applicant: GM GLOBAL TECHNOLOGY OPERATIONS LLC, Detroit, MI (US)

(72) Inventors: Matthew Edward Gilbert-Eyres, Rochester, MI (US); Russell A. Patenaude, Macomb Township, MI (US); Eric T. Hosey, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 346 days.

(21) Appl. No.: 17/304,531

(22) Filed: Jun. 22, 2021

(65) Prior Publication Data

US 2022/0402458 A1 Dec. 22, 2022

(51) Int. Cl.
*B60R 25/10* (2013.01)
*G01S 15/88* (2006.01)
*G06N 20/00* (2019.01)
*H04R 1/22* (2006.01)

(52) U.S. Cl.
CPC .......... *B60R 25/1009* (2013.01); *G01S 15/88* (2013.01); *G06N 20/00* (2019.01); *H04R 1/222* (2013.01)

(58) Field of Classification Search
CPC ..... B60R 25/1009; B60R 25/00; B60R 25/30; B60R 25/307; G01S 15/88; G06N 20/00; H04R 1/222; H04R 2430/20; H04R 3/005; H04R 2499/13
See application file for complete search history.

(56) References Cited

U.S. PATENT DOCUMENTS

| | | | | |
|---|---|---|---|---|
| 5,510,765 A | * | 4/1996 | Madau | B60R 25/1004 340/552 |
| 2005/0004797 A1 | * | 1/2005 | Azencott | G08B 13/1672 704/226 |
| 2009/0092284 A1 | * | 4/2009 | Breed | B60R 21/0153 382/103 |
| 2014/0306799 A1 | * | 10/2014 | Ricci | H04W 4/44 340/5.83 |
| 2018/0108369 A1 | * | 4/2018 | Gross | G06N 3/084 |
| 2018/0290621 A1 | * | 10/2018 | Seaman | B60R 25/104 |
| 2020/0108796 A1 | * | 4/2020 | Björkengren | G08B 13/19647 |
| 2020/0247359 A1 | * | 8/2020 | Murray | G08B 3/10 |
| 2021/0162950 A1 | * | 6/2021 | Larsen | G07C 5/008 |

* cited by examiner

*Primary Examiner* — Mohamed Barakat
*Assistant Examiner* — Rufus C Point
(74) *Attorney, Agent, or Firm* — Lorenz & Kopf LLP (57) ABSTRACT

In an exemplary embodiment, a system is provided that includes a sensor, a computer memory, and a processor. The sensor is configured to be disposed on a vehicle, and is configured to obtain sound or vibration data for the vehicle. The computer memory is configured to store a plurality of known signatures pertaining to a plurality of different types of vehicle theft events. The processor is configured to: compare a signature of the data with the plurality of known signatures stored in the computer memory; and determine whether a vehicle theft event is occurring based on the comparing of the signature of the data with the plurality of known signatures.

20 Claims, 3 Drawing Sheets

METHODS AND SYSTEMS TO DETECT VEHICLE THEFT EVENTS

TECHNICAL FIELD

The technical field generally relates to vehicles, and more particularly relates to methods and systems for detecting theft events.

Certain vehicles today have sensors and systems to detect when a theft event is occurring with respect to a vehicle. However, such existing sensors and systems may not always provide optimal detection of theft events.

Accordingly, it may be desirable to provide improved methods and systems for detecting vehicle theft events. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a system is provided that includes a sensor, a computer memory, and a processor. The sensor is configured to be disposed on a vehicle, and is configured to obtain sound or vibration data for the vehicle. The computer memory is configured to store a plurality of known signatures pertaining to a plurality of different types of vehicle theft events. The processor is configured to: compare a signature of the sound or vibration data with the plurality of known signatures stored in the computer memory; and determine whether a vehicle theft event is occurring based on the comparing of the signature of the sound or vibration data with the plurality of known signatures.

Also in an exemplary embodiment, the sensor includes a microphone; and the sound or vibration data includes sound data from the microphone.

Also in an exemplary embodiment, the sensor includes an ultrasonic sensor; and the sound or vibration data includes vibration data from the ultrasonic sensor.

Also in an exemplary embodiment, the processor is configured to provide instructions for taking a responsive vehicle control action when it is determined that a vehicle theft act is occurring.

Also in an exemplary embodiment, the processor is configured to: compare a first combination of frequencies of a first plurality of sounds or vibrations from the sound or vibration data with a second combination of frequencies of a second plurality of sounds or vibrations from the plurality of known signatures stored in the computer memory; and determine whether the vehicle theft event is occurring based on the comparing of the first combination of frequencies with the second combination of frequencies.

Also in an exemplary embodiment, each of the plurality of known signatures includes a different one of a plurality of tools that are known to be associated with different types of vehicle theft actions; and the processor is configured to determine a type of the vehicle theft event based on which particular one of the plurality of tools is associated with a corresponding one of the plurality of known signatures that matches the signature of the sound or vibration data.

Also in an exemplary embodiment, the processor is further configured to generate the plurality of known signatures using machine learning.

In another exemplary embodiment, a vehicle is provided that includes a body, a sensor, a computer memory, and a processor. The body forms a cabin. The sensor is disposed on a portion of the body, and is configured to obtain sound or vibration data from outside the cabin. The computer memory is configured to store a plurality of known signatures pertaining to a plurality of different types of vehicle theft events. The processor configured to: compare a signature of the sound or vibration data with the plurality of known signatures stored in the computer memory; and determine whether a vehicle theft event is occurring based on the comparing of the signature of the sound or vibration data with the plurality of known signatures.

Also in an exemplary embodiment, the sensor includes a microphone; and the sound or vibration data includes sound data from the microphone.

Also in an exemplary embodiment, the sensor includes an ultrasonic sensor; and the sound or vibration data includes vibration data from the ultrasonic sensor.

Also in an exemplary embodiment, the processor is configured to: compare a first combination of frequencies of a first plurality of sounds or vibrations from the sound or vibration data with a second combination of frequencies of a second plurality of sounds or vibrations from the plurality of known signatures stored in the computer memory; and determine whether the vehicle theft event is occurring based on the comparing of the first combination of frequencies with the second combination of frequencies.

Also in an exemplary embodiment, each of the plurality of known signatures includes a different one of a plurality of tools that are known to be associated with different types of vehicle theft actions; and the processor is configured to determine a type of the vehicle theft event based on which particular one of the plurality of tools is associated with a corresponding one of the plurality of known signatures that matches the signature of the sound or vibration data.

Also in an exemplary embodiment, the processor is configured to provide instructions for taking a responsive vehicle control action when it is determined that a vehicle theft act is occurring.

Also in an exemplary embodiment, the processor is further configured to update the plurality of known signatures via downloads obtained by the vehicle from a remote server.

Also in an exemplary embodiment, the processor is further configured to generate the plurality of known signatures using machine learning.

In another exemplary embodiment, a method is provided that includes: obtaining sound or vibration data for a vehicle via a sensor of the vehicle; comparing, via a processor, a signature of the sound or vibration data with a plurality of known signatures stored in a computer memory; and determining, via the processor, whether a vehicle theft event is occurring based on the comparing of the signature of the sound or vibration data with the plurality of known signatures.

Also in an exemplary embodiment, the step of obtaining the sound or vibration data includes obtaining sound data from outside a cabin of the vehicle via a microphone that is disposed onboard the vehicle.

Also in an exemplary embodiment, the step of obtaining the sound or vibration data includes obtaining external vibration data from outside a cabin of the vehicle via an ultrasonic sensor that is disposed onboard the vehicle.

Also in an exemplary embodiment, the method further includes taking a responsive vehicle control action, via instructions provide by the processor, when it is determined that a vehicle theft act is occurring.

Also in an exemplary embodiment, the step of comparing the signature of the sound or vibration data with the plurality of known signatures includes comparing, via the processor, a first combination of frequencies of a first plurality of sounds or vibrations from the sound or vibration data with a second combination of frequencies of a second plurality of sounds or vibrations from the plurality of known signatures stored in the computer memory; and the step of determining whether the vehicle theft event is occurring includes determining, via the processor, whether the vehicle theft event is occurring based on the comparing of the first combination of frequencies with the second combination of frequencies.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
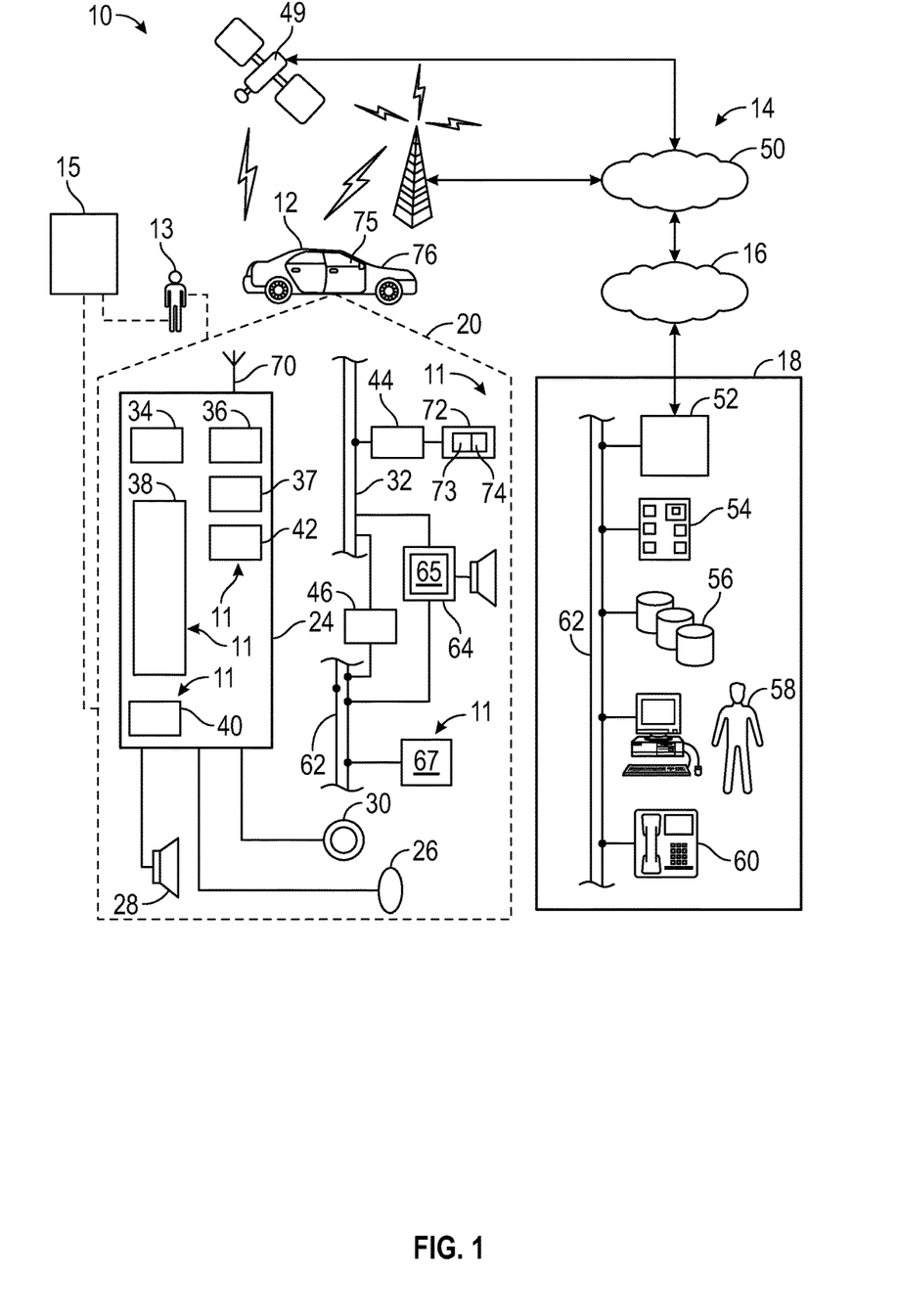
FIG. 1 is a functional block diagram of a communications system that includes a vehicle having a control system that is configured to detect theft events with respect to the vehicle, including based on a sound signature of data collected with respect to the vehicle.

FIG. 1 is a functional block diagram of a communications system 10, in accordance with an exemplary embodiment. As described in greater detail further below, the communications system 10 includes a vehicle 12 that includes a control system 11 that is configured to detect theft events with respect to the vehicle 12, based on a sound signature of data collected with respect to the vehicle 12. As described further below in connection with FIG. 1, in various embodiments, the control system 11 includes a processor 38, computer memory 40, and vehicle sensors 72 that include a vehicle ignition sensor 73 and one or more microphones 74.

In various embodiments, the processor 38 identifies theft events with respect to the vehicle 12 based on a sound signature of data collected via one or more of the microphones 74 that are disposed outside and/or inside a cabin 75 of the vehicle 12. Also in various embodiments, the processor 38 takes appropriate actions in the event of a vehicle theft event, including communications with the remote server 18 depicted in FIG. 1.

In addition, in certain embodiments, the control system 11 may also include one or more communication transmission devices (e.g., a modem 36 and/or transceiver 37) and a satellite-based location determining system component (e.g., GPS) 42, among various other components.

As depicted in FIG. 1, in various embodiments, the vehicle 12 also includes a body 76 that surrounds and defines the cabin 75 of the vehicle 12. Also as depicted in FIG. 1, in certain embodiments, the vehicle 12 includes a rechargeable energy storage system (RESS) 19 (e.g., a vehicle battery) and one or more motors 17 (e.g., one or more internal combustion engines, electric motors, and/or other motors). However, this may vary in other embodiments. As depicted in FIG. 1, in certain embodiments, the user 13 also has a device 15, such as a smart phone, computer, and/or other electronic device 15, for example that may communicate with both the user 13 and the vehicle 12. However, this may also vary in other embodiments.

As depicted in FIG. 1, the communications system 10 generally includes the vehicle 12, along with one or more wireless carrier systems 14, one or more land networks 16, and one or more remote servers 18. It should be appreciated that the overall architecture, setup, and operation, as well as the individual components of the illustrated system are merely exemplary and that differently configured communications systems may also be utilized to implement the examples of the method disclosed herein. Thus, the following paragraphs, which provide a brief overview of the illustrated communications system 10, are not intended to be limiting.

The vehicle 12 may be any type of mobile vehicle such as a motorcycle, car, truck, recreational vehicle (RV), boat, plane, farm equipment, or the like, and is equipped with suitable hardware and software that enables it to communicate over communications system 10. As shown in FIG. 1, in various embodiments the vehicle hardware 20 is disposed within a body 76 of the vehicle 12, and includes a telematics unit 24, a user microphone 26, a speaker 28, and buttons and/or controls 30 connected to the telematics unit 24. In certain embodiments, the user microphone 26 may be different from the microphones 74 of the vehicle sensors 72 of the control system 11 described herein that detect sounds of an environment of the vehicle 12. In certain other embodiments, the user microphone 26 may be the same as one or more of the microphones 74 of the vehicle sensors 72 of the control system 11 described herein that detect sounds of an environment of the vehicle 12. Also in various embodiments, operatively coupled to the telematics unit 24 is a network connection or vehicle bus 32. Examples of suitable network connections include a controller area network (CAN), a media-oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the remote server 18, and generally includes an electronic processing device (processor) 38, one or more types of electronic computer memory 40, a cellular chipset/component 34, a wireless modem 36, a dual mode antenna 70, and a navigation unit containing a GPS chipset/component 42. In one example, the wireless modem 36 includes a computer program and/or set of software routines adapted to be executed within electronic processing device 38.

In various embodiments, the telematics unit 24 can be an embedded/installed within the vehicle 12 at the time of manufacture, or may be an aftermarket unit that is installed after manufacture of the vehicle 12. In various embodiments, the telematics unit 24 enables voice and/or data communications over one or more wireless networks (e.g., wireless carrier systems 14), and/or via wireless networking, thereby allowing communications with the remote server 18 and/or other vehicles and/or systems.

In various embodiments, the telematics unit 24 may use radio transmissions to establish a voice and/or data channel with the wireless carrier systems 14 so that both voice and data transmissions can be sent and received over the voice and/or data channels. Vehicle communications are enabled via the cellular chipset/component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), and the like. In one embodiment, dual mode antenna 70 services the GPS chipset/component 42 and the cellular chipset/component 34. In various embodiments, the telematics unit 24 utilizes cellular communication according to industry standards, such as LTE, 5G, or the like. In addition, in various embodiments, the telematics unit 24 carries out wireless networking between the vehicle 12 and one or more other network devices, for example using one or more wireless protocols such as one or more IEEE 802.11 protocols, WiMAX, or Bluetooth.

The telematics unit 24 may offer a number of different services for users of the vehicle 12, including detecting acting upon theft events with respect to the vehicle 12 based on a sound signature of data collected with respect to the vehicle 12.

In addition, in certain embodiments, the telematics unit 24 may also provide connection with electronic devices 15. In various embodiments, the electronic devices may include, by way of example, various consumer electronic/mobile devices, such as a smart phone, a laptop, a smart wearable device, a tablet computer, a network computer, and/or one or more other electronic devices and/or combinations thereof.

In various embodiments, one or more short-range wireless connection (SRWC) protocols (e.g., Bluetooth/Bluetooth Low Energy, or Wi-Fi) may be utilized. In various embodiments, once the SRWC is established, the electronic devices 15 may be become bonded and/or recognized as network participants for the telematics unit 24, for example for current uses as well as in the future. For example, in certain embodiments, when the electronic device 15 is subsequently in wireless range with the telematics unit 24 after the initial pairing, telematics unit 24 (and/or the remote server 18) may confirm that the electronic device 15 is recognized as already being paired or established as a network participant for communicating with the telematics unit 24 and receiving services therefrom.

In addition, in various embodiments, the telematics unit 24 may also provide other services, such as, by way of example: turn-by-turn directions and other navigation-related services provided in conjunction with the GPS chipset/component 42; emergency assistance services, information requests from the users of the vehicle 12 (e.g., regarding points of interest en route while the vehicle 12 is travelling), and/or infotainment-related services, for example in which music, internet web pages, movies, television programs, videogames, and/or other content are downloaded by an infotainment center 46 that may be part of the telematics unit 24 and/or operatively connected to the telematics unit 24 via vehicle bus 32 and audio bus 22, among various other types of possible services.

With respect to other electronic components utilized in connection with the telematics unit 24, the user microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, user microphone 26 and speaker 28 enable vehicle hardware 20 and remote server 18 to communicate with the occupants through audible speech. The vehicle hardware also includes one or more buttons and/or controls 30 for enabling a vehicle occupant to activate or engage one or more of the vehicle hardware 20 components. For example, one of the buttons and/or controls 30 can be an electronic pushbutton used to initiate voice communication with remote server 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22. In various embodiments, the audio component 64 includes radio system 65 (which also includes antenna 70, as well as amplifiers, speakers, and the like, in certain embodiments).

Also in various embodiments, display component 67 provides a visual, audio, and/or haptic display for the vehicle 12. In various embodiments, the display components 67 provides a visual, audio, and/or haptic alarm notification when a vehicle theft event is determined to be occurring, for example as described in greater detail further below in connection with FIGS. 2 and 3. In certain embodiments, the display component 67 may comprise one or more visual display systems. In certain embodiments, such information may also be provided via an audio system, such as the audio component 64.

In various embodiments, vehicle sensors 72, connected to various sensor interface modules 44, are operatively connected to the vehicle bus 32. Also in various embodiments, the vehicle sensors 72 include both ignition sensors 73 and a microphone 74.

In various embodiments, the ignition sensors 73 detect when a motor or engine of the vehicle 12 (e.g., motor 17) is turned on.

Also in various embodiments, the microphone 74 obtains sound data as to sounds outside the cabin 75 of the vehicle 12, for use in determining when a vehicle theft is occurring based on a sound signature of the microphone data collected with respect to the vehicle 12. In certain embodiments, the microphones 74 comprise one or more external microphones that are disposed outside the vehicle cabin 75 (e.g., on an outer portion and/or outer surface of the body 76 of the vehicle 12) and facing an external environment surrounding the vehicle 12 and outside the cabin 75 thereof. In certain other embodiments, the microphones 74 comprise one or more internal microphones that are disposed inside the vehicle cabin 75 (e.g., on an outer portion and/or outer surface of the body 76 of the vehicle 12). In yet other embodiments, the microphones 74 comprise both external microphones and internal microphones. For example, in certain embodiments, multiple microphones 74 may be utilized at different respective locations along the outer and/or inner surfaces of the body 76.

In various embodiments, the processor 38 is configured to compare the sound signature of the microphone data with known sound signatures stored in the memory 40, including known sound signatures of different types of vehicle theft events as well as known signatures of other types of events that are known to not be associated with vehicle theft events. Also in various embodiments, the wireless modem 36 and/or transceiver 37 provide information pertaining to the vehicle theft event to the remote server 18 (e.g., via one or more wireless carrier systems 14 and/or land networks 16) for appropriate action.

In addition, in various embodiments, the vehicle sensors 72 may also include any number of additional sensors including, by way of example, gyroscopes, accelerometers, magnetometers, emission detection, and/or control sensors, and the like. Also in various embodiments, exemplary sensor interface modules 44 include powertrain control, climate control, and body control, to name but a few.

In various embodiments, the wireless carrier systems 14 may be any number of cellular telephone systems, satellite-based wireless systems, and/or any other suitable wireless systems, for example that transmits signals between the vehicle hardware 20 and land networks 16 (and/or, in certain embodiments, that communicate directly with the vehicle 12 and/or the remote server 18). According to certain examples, wireless carrier systems 14 may include and/or be coupled to one or more cell towers 48, satellites 49, base stations and/or mobile switching centers (MSCs) 50, as well as any other networking components required to connect the wireless carrier systems 14 with land networks 16. As appreciated by those skilled in the art, various cell tower/base station/MSC arrangements are possible and could be used with wireless carrier systems 14.

The land networks 16 can be a conventional land-based telecommunications network that is connected to one or more landline telephones, and that connects wireless carrier systems 14 to remote server 18. For example, the land networks 16 can include a public switched telephone network (PSTN) and/or an Internet protocol (IP) network, as is appreciated by those skilled in the art. Of course, one or more segments of the land networks 16 can be implemented in the form of a standard wired network, a fiber or other optical network, a cable network, other wireless networks such as wireless local networks (WLANs) or networks providing broadband wireless access (BWA), or any combination thereof.

The remote server 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing. In various embodiments, the remote server 18 provides responsive actions when a vehicle theft event is occurring, such as contacting appropriate authorities and/or controlling one or more vehicle functions.

The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a remote server 18 that is manned, it will be appreciated that the remote server 18 can be any central or remote facility, manned or unmanned, mobile, or fixed.

Figure 2:
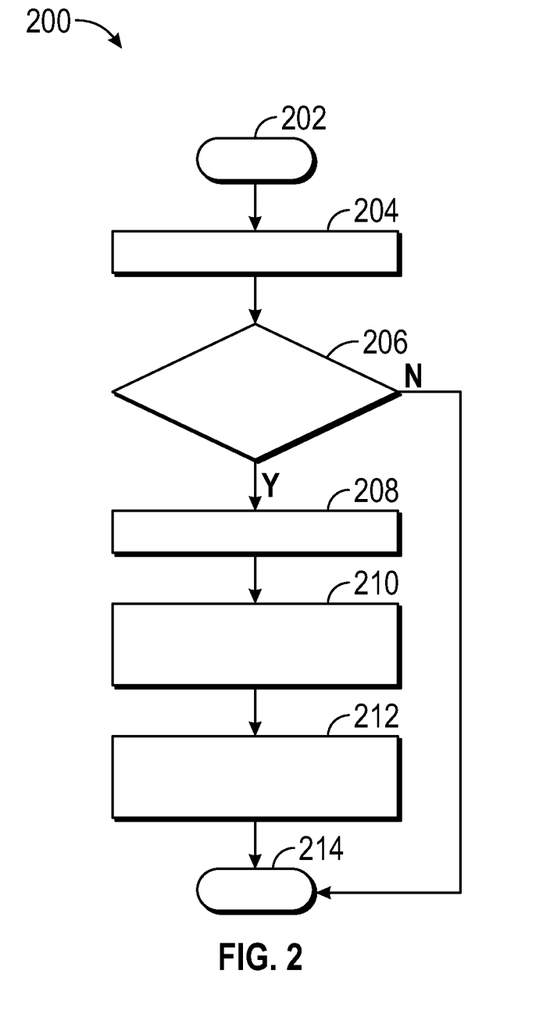
FIG. 2 is a flowchart of a process for detecting and acting upon theft events with respect to the vehicle of the communications system of FIG. 1, using the control system thereof.

FIG. 2 is a flowchart of a process 200 for detecting and acting upon theft events with respect to a vehicle, in accordance with an exemplary embodiment. In various embodiments, process 200 may be implemented in connection with the vehicle 12 of the communications system 10 of FIG. 1, using the control system 11 thereof.

As depicted in FIG. 2, in various embodiments the process 200 begins at step 202. In certain embodiments, the process 200 begins when one or more users of the vehicle 12 (e.g., a driver) approaches or enters the vehicle 12, or turns on the vehicle 12 and/or an ignition therefor (e.g. by turning a key, engaging a keyfob or start button, and so on), and/or when a vehicle drive begins or is initiated. In certain embodiments, the process 200 begins when an engine or motor (e.g., the motor 17 of FIG. 1) of the vehicle 12 is turned on, for example as detected by one or more ignition sensors 73 of FIG. 1 (step 204).

In various embodiments, a determination is made as to whether the control system (e.g., the control system 11 of FIG. 1) is active (step 206). In various embodiments, during step 206, the processor 38 of FIG. 1 determines whether the control system 11 of FIG. 1 is active (e.g., turned on).

In certain embodiments, if it is determined in step 206 that the theft system is not active, then the process terminates at step 214.

Conversely, in various embodiments, if it is instead determined in step 206 that the theft system is turned on, then the process instead proceeds to step 210, described below.

In various embodiments, during step 208, one or more sensors are activated for the control system 11 of FIG. 1. In certain embodiments, the microphones 74 of FIG. 1 are activated (e.g., turned on) via instructions provided by the processor 38 of FIG. 1. In various embodiments, external and internal microphones 74 are activated, as well as other sensors, such as ultrasonic sensors.

In various embodiments, data is collected and analyzed with respect to potential theft events for the vehicle (step 210). In various embodiments, sensor data is obtained via the vehicle sensors 72 of FIG. 1 (including the microphone 74) with respect sounds outside the vehicle cabin 75, and a sound signature for the recorded sounds is analyzed by the processor 38 of FIG. 1 and compared with known sound signatures from different types of vehicle theft events as stored in the memory 40 of FIG. 1. In various embodiments, the sound signatures comprise a plurality of different frequencies corresponding to different sounds outside the vehicle 12. In certain embodiments, the sound signature also includes one or more directions from which the sounds originate. For example, in certain embodiments, the an array of microphones 74 is utilized to triangulate the directions from which the sounds originate, for example for use in determining whether a vehicle theft is occurring and/or what type of vehicle theft event may be occurring (e.g., whether a tire is being stolen, or whether a saw noise under the vehicle 12 may indicate that a catalytic converter is being stolen, and so on). In certain embodiments (e.g., using ultrasonic sensors instead of or in addition to microphones), vibration patterns may be analyzed.

Figure 3:
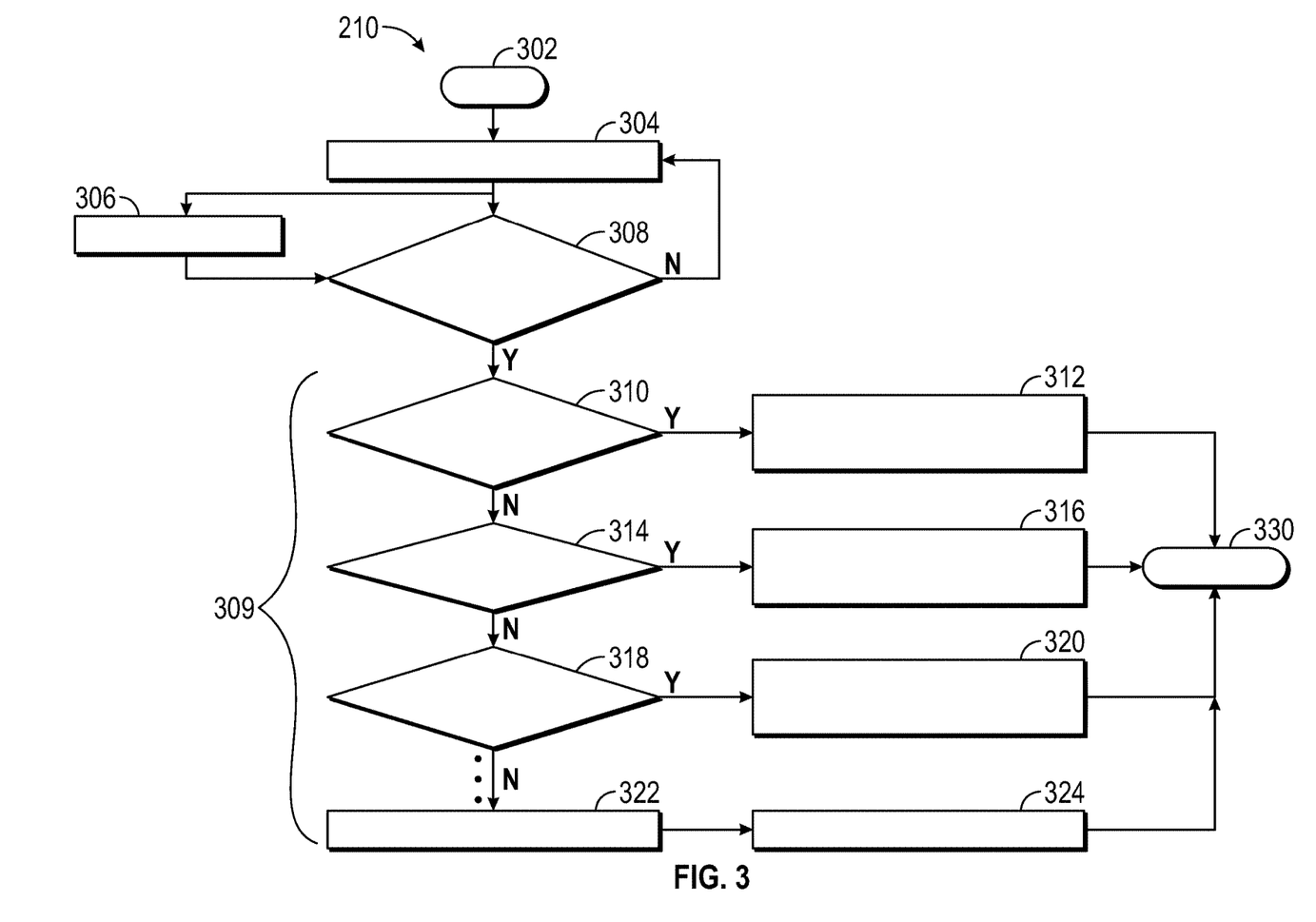
FIG. 3 is a flowchart of a subprocess of the process of FIG. 2, including a subprocess for determining the theft event based on a sound signature of the data collected with respect to the vehicle.

With reference to FIG. 3, a flowchart is provided for the step (or subprocess) 210 of collecting and analyzing the data (including the sound signature outside the vehicle) for the potential vehicle theft event. As depicted in FIG. 3, in exemplary embodiments the step (or subprocess) 210 begins at 302, and includes the collection of data (step 304).

In various embodiments, during step 302, the sensor data is collected as to an environment outside the cabin 75 of the vehicle 12 of FIG. 1. In various embodiments, the sensor data includes sound data that is obtained and recorded via the microphone 74 of FIG. 1. It will be appreciated that in various embodiments multiple microphones 74 may be utilized (e.g., at different locations on an exterior surface of the body, in certain embodiments). In certain embodiments, one or more other sensors (e.g., including ultrasonic sensors) may also be utilized vibration data and/or other sensor data.

In various embodiments, during certain iterations of the subprocess 210 (and of the process 200), training is performed with the collected data (step 306). In various embodiments, during such training iterations, the sound signature of the collected data is correlated with known activities surrounding the vehicle 12, for example as reported by a user or observer of the vehicle 12. For example, in certain embodiments, during a training iteration, a human user or observer may visually observe that a tool is being operated outside the vehicle 12 in a manner that could be utilized in a vehicle theft event (e.g., operation of hydraulic equipment, saws, one or more other cutting devices, and so on), and the recorded sound signature of such event is correlated with the observed activity and stored in the memory 40 of FIG. 1. In various embodiments, such training iterations may occur within the vehicle 12 itself (e.g., during training and/or other operation) and/or within or vehicles (e.g., during research and production of the vehicle type). In various embodiments, such training and learning utilizes machine learning via the processor 38 of FIG. 1 and/or one or more other processors. In certain embodiments (e.g., using ultrasonic sensors instead of or in addition to microphones), vibration patterns may also be utilized in a similar manner.

In addition, in various embodiments, as part of and/or in addition to the training of step 306, the sound signature and/or profile (e.g., vibration signature) may be uploaded (e.g., to a computer and/or computer memory) and correlated (e.g., after the fact) to events. In various embodiments, continuous learning may be performed utilized using these techniques. Also in various embodiments, such learning may be utilized not only for training but also for updating the sound signatures and/or correlations with various events (e.g., as stored in computer memory) after the initial launch or deployment of the control system. In various embodiments, the system can be subsequently updated in this manner, for exampling using over-the-air long range communications (and/or other communications techniques) to the telematics module for updates. In addition, also in various embodiments, the control system and telematics module may also learn and/or be updated with enhanced learning and/or knowledge of "normal" (i.e., not pertaining to vehicle theft events) ambient sounds over time, to help distinguish such sounds from vehicle theft events in the future. For example, in certain embodiments, different ambient sounds of different types of environments (e.g., a busy city versus rural countryside), different types of weather (e.g., a calm weather duty versus a thunderstorm), and so on, may be identified, analyzed, and utilized in connection with the process 300 over time. In certain embodiments (e.g., using ultrasonic sensors instead of or in addition to microphones), vibration patterns may also be utilized in a similar manner.

In various embodiments, a determination is made as to whether the data of step 304 matches any stored patterns (step 308). In various embodiments, during step 308, the processor 38 of FIG. 1 compares a sound signature of the data of step 304 with known sound signatures pertaining to various events as stored in the memory 40 of FIG. 1 (e.g., in various embodiments, representing the correlations ascertained during the machine learning of various prior iterations of step 306). In certain embodiments (e.g., using ultrasonic sensors instead of or in addition to microphones), vibration patterns may also be utilized in a similar manner.

As used throughout this Application, the sound signature of the collected data pertains to one or more frequencies and/or combinations of frequencies of different of sounds as sensed and recorded by the microphone. Also as used throughout this Application, the known sound signatures pertaining to various events pertain to one or more frequencies and/or combinations of frequencies of different sounds that are known or expected with respect to such events. In various embodiments, new methods and profiles may be continuously added to the control system and telematics module over time to further enhance learning for the control system and the telematics module. For example, in certain embodiments, various updates may be provided from the remote server 18 to the vehicle 12 over time (e.g., via long range wireless connectivity with the telematics unit 24) that include additional sound signatures and additional correlations between sound signatures and known events, and/or that may also include additional steps and/or methods for matching sound signatures with events going forward. In certain embodiments (e.g., using ultrasonic sensors instead of or in addition to microphones), vibration patterns may also be utilized in a similar manner.

In various embodiments, if it is determined in step 308 that the data does not match any stored patterns, then the process returns to step 304. In various embodiments, steps 304-308 then repeat in new iterations until a determination is made during an iteration of step 308 in which the data matches a stored pattern, after which the process proceeds to 309, described below.

During 309, various specific determinations are made with respect to a specific match between the sound signature of the data of step 304 with a corresponding matching sound signature of a plurality of possible known sound signature stored in the memory 40 of FIG. 1. As depicted in FIG. 3, in various embodiments, the determinations of step 309 may include a number of different determinations by the processor 38 of FIG. 1 as to whether the sound signature of the data matches different corresponding known sound signatures from different types of vehicle theft actions that may result in different sounds.

For example, in certain embodiments, a first determination is made by the processor 38 at 310 as to whether the sound signature of the data matches a first specific type of stored known sound signature stored in the memory 40 that pertains to a first specific type of vehicle theft event. For example, in an exemplary embodiment, during 310 a first determination is made by the processor 38 as to whether the sound signature of the data matches a first stored known sound signature pertaining to a first type of vehicle theft action. For example, in one embodiment, the first type of vehicle theft action corresponds to use of a wrench (e.g., an impact wrench) in a vehicle theft event. However, this may vary in other embodiments.

In various embodiments, if it is determined at 310 that the sound signature of the data matches the first specific type of stored known sound signature as to the first specific type of vehicle theft event, then a first action is taken at 312. In certain embodiments, a first type of theft alarm is initiated, via instructions provided by the processor 38, that corresponds to the first type of vehicle theft event. In one such embodiment, a determination that the sound signature pertains to an impact wrench may trigger an alarm at 312 that a wheel theft is in progress with respect to the vehicle 12. In various embodiments, the alarm is implemented at 330 with a return back to the steps of FIG. 2, with step 212 (described further below).

Conversely, in various embodiments, if it is instead determined at 310 that the sound signature of the data does not match the first specific type of stored known sound signature as to the first specific type of vehicle theft event, then the process proceeds instead to step 314, described directly below.

In various embodiments, during step 314, a second determination is made by the processor 38 as to whether the sound signature of the data matches a second specific type of stored known sound signature stored in the memory 40 that pertains to a second specific type of vehicle theft event. For example, in an exemplary embodiment, during 314 a second determination is made by the processor 38 as to whether the sound signature of the data matches a second stored known sound signature pertaining to a second type of vehicle theft action. For example, in one embodiment, the second type of vehicle theft action corresponds to use of a hydraulic tool, saw, and/or other cutting tool in a vehicle theft event. However, this may vary in other embodiments.

In various embodiments, if it is determined at 314 that the sound signature of the data matches the second specific type of stored known sound signature as to the second specific type of vehicle theft event, then a second action is taken at 316. In certain embodiments, a second type of theft alarm is initiated, via instructions provided by the processor 38, that corresponds to the second type of vehicle theft event. In one such embodiment, a determination that the sound signature pertains to a hydraulic tool, saw, and/or other cutting tool may trigger an alarm at 316 that a catalytic converter and/or other exhaust theft is in progress with respect to the vehicle 12. In various embodiments, the alarm is implemented at 330 with a return back to the steps of FIG. 2, with step 212 (described further below).

Conversely, in various embodiments, if it is instead determined at 314 that the sound signature of the data does not match the second specific type of stored known sound signature as to the second specific type of vehicle theft event, then the process proceeds instead to step 318, described directly below.

In various embodiments, during step 318, a third determination is made by the processor 38 as to whether the sound signature of the data matches a third specific type of stored known sound signature stored in the memory 40 that pertains to a third specific type of vehicle theft event. For example, in an exemplary embodiment, during 318 a third determination is made by the processor 38 as to whether the sound signature of the data matches a third stored known sound signature pertaining to a disconnection of a vehicle battery (such as the battery 19 of FIG. 1). In one exemplary embodiment, a sound of a metal lockout tool (e.g., a "slim jim") device scraping on a window or door of the vehicle may be identified and matched. In other exemplary embodiments, identifying and matching known non-theft patterns may also be performed (e.g., noise from a horn of another vehicle, or a thunderstorm, or the like), for example to help prevent false-positive identifications.

In various embodiments, if it is determined at 318 that the sound signature of the data matches the third specific type of stored known sound signature as to the third specific type of vehicle theft event, then a third action is taken at 320. In certain embodiments, a third type of theft alarm is initiated, via instructions provided by the processor 38, that corresponds to the third type of vehicle theft event. In one such embodiment, a determination that the sound signature pertains to a tool or known activity for disconnecting a vehicle battery may trigger an alarm at 320 that a vehicle battery theft is in progress with respect to the vehicle 12. In various embodiments, the alarm is implemented at 330 with a return back to the steps of FIG. 2, with step 212 (described further below).

Conversely, in various embodiments, if it is instead determined at 318 that the sound signature of the data does not match the third specific type of stored known sound signature as to the third specific type of vehicle theft event, then the process proceeds instead to step 322, described directly below.

In various embodiments, during step 322, an identification is made as to one or more additional vehicle theft events that pertain to the sound signature of the data. In various embodiments, this determination is made by the processor 38 of FIG. 1 based on the data obtained by the microphone 74 of FIG. 1 in comparison with various stored known sound signatures from the memory 40 of FIG. 1. Also in various embodiments, one or more additional types of theft alarms are initiated at 324, via instructions provided by the processor 38, that correspond to the additional types of vehicle theft events. In certain embodiments, such additional types of sound signatures that may be utilized may include the following, among others: a tow truck, wrenches, chains, removing vehicle modules, drills, jacks, lockout devices (e.g., "slim jims"), mechanic rolling devices (e.g., a "creeper" device) for sliding under a vehicle, scraping concrete (e.g., blocks), bats and/or crowbars, and the like. In various embodiments, the alarm is implemented at 330 with a return back to the steps of FIG. 2, with step 212 (described further below).

Similar to the discussions above, for the various steps described herein, it will be appreciated that in certain embodiments (e.g., using ultrasonic sensors instead of or in addition to microphones), vibration patterns may also be utilized in a similar manner as the sound signatures.

With reference back to FIG. 2, in various embodiments, the identified alarms are activated at step 212. Specifically, in various embodiments the processor 38 of FIG. 1 provides instructions for implementation of one or more of the types of theft alarms identified in steps 312, 316, 320, or 324. In various embodiments, one or more messages are transmitted to the remote server 18 of FIG. 1 identifying the type of vehicle theft, via the wireless modem 36 and/or transceiver 37 in accordance with instructions provided by the processor 38 (e.g., via one or more wireless carrier systems 14 and/or land networks 16 of FIG. 1). In various embodiments, the vehicle 12 and/or the remote server 18 send appropriate notifications to one or more third parties, such as to one or more law enforcement agencies or officials pertaining to the vehicle theft action. In addition, in various embodiments, one or more messages are also provided for a driver, operator, and/or other user of the vehicle 12, for example one or more audio, visual, and/or haptic notifications via the display 67 of the vehicle 12 and/or the electronic device 15 of the user 13 of FIG. 1 (e.g., in accordance with instructions provided by the processor 38 of FIG. 1). Also in various embodiments, one or more other vehicle control actions may also be performed, such as honking of a horn of the vehicle, flashing lights of the vehicle, generating a siren noise and/or one or more other noises, or the like, via instructions provided by the processor 38 of FIG. 1.

In various embodiments, the process then terminates at 214.

Accordingly, in various embodiments, methods and systems are provided for identifying and taking action with respect to a vehicle theft event. In various embodiments, a sound signature of data collected for the vehicle (including sounds outside the vehicle in various embodiments) is compared with known sound signatures of different types of vehicle theft events, and appropriate actions are taken with respect to the identified vehicle theft event.

It will be appreciated that the systems and methods may vary from those depicted in the Figures and described herein. For example, the communications system of FIG. 1, including the vehicle thereof and components thereof, may vary from that depicted in FIG. 1 and/or described herein, in various embodiments. It will similarly be appreciated that the control system of FIG. 1, and/or various components thereof and/or functionality thereof, may vary from the depictions in FIG. 1 and the accompanying descriptions. It will also be appreciated that the process (and/or subprocesses) disclosed herein may differ from those described herein and/or depicted in FIGS. 2 and 3, and/or that steps thereof may be performed simultaneously and/or in a different order as described herein and/or depicted in FIGS. 2 and 3, among other possible variations.

While at least one example has been presented in the foregoing detailed description, it should be appreciated that a vast number of variations exist. It should also be appreciated that the example or examples are only examples, and are not intended to limit the scope, applicability, or configuration of the disclosure in any way. Rather, the foregoing detailed description will provide those skilled in the art with a convenient road map for implementing the example or examples. It should be understood that various changes can be made in the function and arrangement of elements without departing from the scope of the appended claims and the legal equivalents thereof

What is claimed is:

1. A system comprising:
a sensor configured to be disposed on a vehicle and configured to obtain sound or vibration data for the vehicle, outside the vehicle, including a first combination of frequencies and locations of a first plurality of sounds or vibrations from the sound or vibration data outside the vehicle;
a computer memory configured to store a plurality of known signatures pertaining to a plurality of different types of vehicle theft events, the plurality of known signatures comprising a second combination of frequencies and locations corresponding to different sounds or vibrations, as to a plurality of types of events, including vehicle theft events; and
a processor configured to:
compare a signature of the sound or vibration data with the plurality of known signatures stored in the computer memory, by comparing the first combination of frequencies and locations of the first plurality of sounds or vibrations from the sound or vibration data outside the vehicle with the second combination of frequencies and locations of a second plurality of sounds or vibrations from the plurality of known signatures stored in the computer memory; and
determine whether a vehicle theft event is occurring based on the comparing of the signature of the sound or vibration data with the plurality of known signatures, including as to the comparing of the first combination of frequencies and locations of the first plurality of sounds or vibrations from the sound or vibration data outside the vehicle with the second combination of frequencies and locations of the second plurality of sounds or vibrations from the plurality of known signatures stored in the computer memory.

2. The system of claim 1, wherein:
the sensor comprises a microphone; and
the sound or vibration data comprises sound data from the microphone.

3. The system of claim 1, wherein:
the sensor comprises an ultrasonic sensor; and
the sound or vibration data comprises vibration data from the ultrasonic sensor.

4. The system of claim 1, wherein the processor is configured to provide instructions for taking a responsive vehicle control action when it is determined that a vehicle theft act is occurring.

5. The system of claim 1, wherein:
each of the plurality of known signatures comprises a different one of a plurality of tools that are known to be associated with different types of vehicle theft actions, wherein the plurality of tools include one or more cutting devices, one or more types of hydraulic equipment, or both; and
the processor is configured to determine a type of the vehicle theft event based on which particular one of the plurality of tools is associated with a corresponding one of the plurality of known signatures that matches the signature of the sound or vibration data.

6. The system of claim 1, wherein the processor is further configured to generate the plurality of known signatures using machine learning in connection with the plurality of known signatures comprising the second combination of frequencies and locations corresponding to different sounds or vibrations, as to the plurality of types of events, including vehicle theft events, and further including enhanced learning as to ambient sounds that correspond to an environment surrounding the vehicle when no vehicle theft actions are occurring.

7. The system of claim 5, wherein the plurality of tools include one or more saws.

8. The system of claim 5, wherein the plurality of tools include the one or more types of hydraulic equipment.

9. The system of claim 6, wherein the machine learning further includes enhanced learning as to the ambient sounds based on whether the environment surrounding the vehicle comprises a urban environment versus a rural environment.

10. The system of claim 6, wherein the machine learning further includes enhanced learning as to the ambient sounds based on weather conditions associated with the environment surrounding the vehicle.

11. A vehicle comprising:
a body forming a cabin;
a sensor disposed on a portion of the body and configured to obtain sound or vibration data from outside the cabin, including a first combination of frequencies and locations of a first plurality of sounds or vibrations from the sound or vibration data outside the cabin;

a computer memory configured to store a plurality of known signatures pertaining to a plurality of different types of vehicle theft events, the plurality of known signatures comprising a second combination of frequencies and locations corresponding to different sounds or vibrations, as to a plurality of types of events, including vehicle theft events; and a processor configured to:
- compare a signature of the sound or vibration data with the plurality of known signatures stored in the computer memory, by comparing the first combination of frequencies and locations of the first plurality of sounds or vibrations from the sound or vibration data outside the vehicle with the second combination of frequencies and locations of a second plurality of sounds or vibrations from the plurality of known signatures stored in the computer memory; and
- determine whether a vehicle theft event is occurring based on the comparing of the signature of the sound or vibration data with the plurality of known signatures, including as to the comparing of the first combination of frequencies and locations of the first plurality of sounds or vibrations from the sound or vibration data outside the vehicle with the second combination of frequencies and locations of the second plurality of sounds or vibrations from the plurality of known signatures stored in the computer memory.

12. The vehicle of claim 11, wherein:
the sensor comprises a microphone; and
the sound or vibration data comprises sound data from the microphone.

13. The vehicle of claim 11, wherein:
the sensor comprises an ultrasonic sensor; and
the sound or vibration data comprises vibration data from the ultrasonic sensor.

14. The vehicle of claim 11, wherein:
each of the plurality of known signatures comprises a different one of a plurality of tools that are known to be associated with different types of vehicle theft actions, wherein the plurality of tools include one or more cutting devices, one or more types of hydraulic equipment, or both; and
the processor is configured to determine a type of the vehicle theft event based on which particular one of the plurality of tools is associated with a corresponding one of the plurality of known signatures that matches the signature of the sound or vibration data.

15. The vehicle of claim 11, wherein the processor is configured to provide instructions for taking a responsive vehicle control action when it is determined that a vehicle theft act is occurring.

16. The vehicle of claim 11, wherein the processor is further configured to update the plurality of known signatures via downloads obtained by the vehicle from a remote server.

17. The vehicle of claim 11, wherein the processor is further configured to generate the plurality of known signatures using machine learning in connection with the plurality of known signatures comprising the second combination of frequencies and locations corresponding to different sounds or vibrations, as to the plurality of types of events, including vehicle theft events, and further including enhanced learning as to ambient sounds that correspond to an environment surrounding the vehicle when no vehicle theft actions are occurring.

18. A method comprising:
obtaining sound or vibration data for a vehicle via a sensor of the vehicle, including a first combination of frequencies and locations of a first plurality of sounds or vibrations from the sound or vibration data for the vehicle;

comparing, via a processor, a signature of the sound or vibration data with a plurality of known signatures stored in a computer memory, by comparing the first combination of frequencies and locations of the first plurality of sounds or vibrations from the sound or vibration data outside the vehicle with a second combination of frequencies and locations of a second plurality of sounds or vibrations from the plurality of known signatures stored in the computer memory; and determining, via the processor, whether a vehicle theft event is occurring based on the comparing of the signature of the sound or vibration data with the plurality of known signatures, including as to the comparing of the first combination of frequencies and locations of the first plurality of sounds or vibrations from the sound or vibration data outside the vehicle with the second combination of frequencies and locations of the second plurality of sounds or vibrations from the plurality of known signatures stored in the computer memory.

19. The method of claim 18, wherein the step of obtaining the sound or vibration data comprises both:
obtaining sound data from outside a cabin of the vehicle via a microphone that is disposed onboard the vehicle; and obtaining external vibration data from outside the cabin of the vehicle via an ultrasonic sensor that is disposed onboard the vehicle;

wherein the comparing and the determining are performed with respect to comparisons of both the sound data and the vibration data, including respective frequencies and locations associated therewith, with the plurality of known signatures stored in the computer memory.

20. The method of claim 18, further comprising:
taking a responsive vehicle control action, via instructions provide by the processor, when it is determined that a vehicle theft act is occurring.

* * * * *